United States Patent
Imbimbo et al.

(10) Patent No.: US 9,571,563 B2
(45) Date of Patent: Feb. 14, 2017

(54) HANDLING A SHARED DATA OBJECT IN A COMMUNICATION NETWORK

(75) Inventors: Amedeo Imbimbo, Caivano (IT); Giuseppe Carnevale, Naples (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 93 days.

(21) Appl. No.: 14/422,257

(22) PCT Filed: Aug. 23, 2012

(86) PCT No.: PCT/EP2012/066456
§ 371 (c)(1),
(2), (4) Date: Feb. 18, 2015

(87) PCT Pub. No.: WO2014/029441
PCT Pub. Date: Feb. 27, 2014

(65) Prior Publication Data
US 2015/0207862 A1    Jul. 23, 2015

(51) Int. Cl.
*H04L 29/08* (2006.01)
*G06F 17/30* (2006.01)
*H04L 29/06* (2006.01)

(52) U.S. Cl.
CPC ......... *H04L 67/10* (2013.01); *G06F 17/30867* (2013.01); *H04L 67/24* (2013.01); *H04L 67/32* (2013.01); *H04L 65/1006* (2013.01); *H04L 65/4038* (2013.01); *H04L 67/1044* (2013.01)

(58) Field of Classification Search
CPC ......... H04L 67/10; H04L 67/32; H04L 67/24; H04L 67/1044; H04L 65/4038; H04L 65/1006; G06F 17/30867
See application file for complete search history.

(56) References Cited

U.S. PATENT DOCUMENTS

2006/0069702 A1* 3/2006 Moeller ................. G06F 9/542
2007/0192325 A1   8/2007 Morris
(Continued)

OTHER PUBLICATIONS

International Search Report and Written Opinion of the International Searching Authority, PCT International Application No. PCT/EP2012/066456, Apr. 26, 2013.
(Continued)

*Primary Examiner* — Cheikh Ndiaye
(74) *Attorney, Agent, or Firm* — Patent Portfolio Builders, PLLC (57) ABSTRACT

A method and apparatus for handling a data object accessible by more than one node. A server in a communication network stores information relating to the data object stored at a first node. The server then receives a subscription request message from a second node. This subscription request message subscribes to updates relating to the data object stored at the first node. A copy of the data object is accessible by the second node. The server subsequently receives a publication message relating to a change to the data object stored at the first node and which indicates an identity of the data object and an indication of the changes. The server sends a notification message relating to the change to the data object towards the second node, which is usable by the second node to make corresponding changes to the copy of the data object accessible by the second node.

13 Claims, 7 Drawing Sheets

(56) References Cited

U.S. PATENT DOCUMENTS

| | | | | |
|---|---|---|---|---|
| 2008/0301228 | A1* | 12/2008 | Flavin | G06Q 10/10 709/204 |
| 2011/0214051 | A1* | 9/2011 | Petronijevic | G06F 17/30569 715/255 |
| 2011/0320407 | A1* | 12/2011 | Augustine | G06F 17/30351 707/636 |
| 2013/0218845 | A1* | 8/2013 | Kleppner | G06F 17/30165 707/687 |

OTHER PUBLICATIONS

3GPP, Technical Specification, "3rd Generation Partnership Project; Technical Specification Group Services and System Aspects; Network Architecture (Release 10)", 3GPP TS 23.002 V10.2.0 (Mar. 2011), 93 pp.

3GPP, Technical Specification, "3rd Generation Partnership Project; Technical Specification Group Core Network and Terminals; IP Multimedia (IM) session handling; IM call model; Stage 2 (Release 11)", 3GPP TS 23.218 V11.0.0 (Sep. 2011), 65 pp.

3GPP, Technical Specification, "3rd Generation Partnership Project; Technical Specification Group Services and System Aspects; IP Multimedia Subsystem (IMS); Stage 2 (Release 10)", 3GPP TS 23.228 V10.4.0 (Mar. 2011), 272 pp.

3GPP, Technical Specification, "3rd Generation Partnership Project; Technical Specification Group Core Network and Terminals; Presence service using the IP Multimedia (IM); Core Network (CN) subsystem; Stage 3 (Release 10)", 3GPP TS 24.141 V10.0.0 (Mar. 2011), 131 pp.

3GPP, Technical Specification, "3rd Generation Partnership Project; Technical Specification Group Services and System Aspects; Telecommunication management; Charging management; Charging principles (Release 5)", 3GPP TS 32.200 V5.9.0 (Sep. 2005), 89 pp.

3GPP, Technical Specification, "3rd Generation Partnership Project; Technical Specification Group Services and System Aspects; Telecommunication management; Charging management; Charging data description for the IP Multimedia Subsystem (IMS) (Release 5)", 3GPP TS 32.225 V5.11.0 (Mar. 2006), 63 pp.

3GPP, Technical Specification, "3rd Generation Partnership Project; Technical Specification Group Services and System Aspects; 3G security; Access security for IP-based services (Release 11)", 3GPP TS 33.203 V11.0.0 (Dec. 2010), 114 pp.

3GPP, Technical Specification, "3rd Generation Partnership Project; Technical Specification Group Services and System Aspects; 3G security; Network Domain Security (NDS); IP network layer security (Release 10)", 3GPP TS 33.210 V10.2.0 (Mar. 2011), 24 pp.

Open Mobile Alliance, "XML Document Management (XDM) Specification" Draft Version 2.2, Aug. 20, 2011, 166 pp.

Saint-Andre, P., Ed., "Extensible Messaging and Presence Protocol (XMPP): Core", RFC 3920, Oct. 2004, <http://www.rfc-editor.org/info/rfc3920>.

Saint-Andre, P., Ed., "Extensible Messaging and Presence Protocol (XMPP): Instant Messaging and Presence", RFC 3921, Oct. 2004, <http://www.rfc-editor.org/info/rfc3921>.

Saint-Andre, P., "Mapping the Extensible Messaging and Presence Protocol (XMPP) to Common Presence and Instant Messaging (CPIM)", RFC 3922, Oct. 2004, <http://www.rfc-editor.org/info/rfc3922>.

Saint-Andre, P., "End-to-End Signing and Object Encryption for the Extensible Messaging and Presence Protocol (XMPP)", RFC 3923, Oct. 2004, <http://www.rfc-editor.org/info/rfc3923>.

Saint-Andre, P., "Extensible Messaging and Presence Protocol (XMPP): Core", RFC 6120, Mar. 2011, <http://www.rfc-editor.org/info/rfc6120>.

Saint-Andre, P., "Extensible Messaging and Presence Protocol (XMPP): Instant Messaging and Presence", RFC 6121, Mar. 2011, <http://www.rfc-editor.org/info/rfc6121>.

Saint-Andre, P., "Extensible Messaging and Presence Protocol (XMPP): Address Format", RFC 6122, Mar. 2011, <http://www.rfc-editor.org/info/rfc6122>.

* cited by examiner

HANDLING A SHARED DATA OBJECT IN A COMMUNICATION NETWORK

CROSS REFERENCE TO RELATED APPLICATION

This application is a 35 U.S.C. §371 national stage application of PCT International Application No. PCT/EP2012/066456, filed on 23 Aug. 2012, the disclosure and content of which is incorporated by reference herein in its entirety. The above-referenced PCT International Application was published in the English language as International Publication No. WO 2014/029441 A1 on 27 Feb. 2014.

TECHNICAL FIELD

The invention relates to handling a data object, in particular a shared data object, in a communication network.

BACKGROUND

Presence, group and data management (PGM) enables IP Multimedia Subsystem (IMS) services and applications. By managing presence and group information, the user experience of a communications network is enhanced and IMS based services become more appealing to end-users.

Presence information typically refers to the status or availability of an end-user or resource in a network (termed a presentity). For example presence information can include a mood or location of the user, or the availability of different applications. The use of presence information allows users to manage how, when and with whom to communicate. Group and Data Management refers to the users' ability to handle network based groups and data such as contact lists, chat groups, et cetera.

PGM in an IMS network resides in the application layer of the IMS network. PGM provides presence, group and data management capabilities to other IMS applications. The use of open standards and protocols in PGM allows an operator to build applications that will attract the end-users. For applications to work across different networks and operators they must be standardized. An example of such a standardized application is Push-to-Talk (PTT), which is based on the OMA Push to talk Over Cellular (PoC) standard. However, non-standardized applications can also be developed using PGM functionality. Applications can be developed by a network operator or third party supplier.

Examples of applications that can be enriched with PGM functionality are Presence Enhanced Phone Book (PEP), Multimedia Telephony, Gaming, Widgets, Instant Messaging (IM), Dating, Enterprise services, IPTV, Push-To-Talk (PTT) and Advertising. PGM is an enabler in the operator's service networks that adds value by enhancing person-to-person communication as well as opening the way for new content-to-person applications. PGM can be used in many different applications.

In person-to-person and content-to-person applications, presence can be seen as a dynamic profile of status information for persons, resources, applications or machines that is visible to others. When applied to person-to person communications, presence provides users with the current status information (presence attributes and information) of other users. Examples of such presence information include person specific availability (the user can define his/her current availability, for example "in a meeting", "busy" or "vacation"), a tagline (a user can enter a free text, similar to the commonly used micro blogs), a mooed (a user can inform his/her friends about current mood, for example "angry", "stressed" or "happy"), a location (a user states where he/she is currently located, for example "at home", "at the office"). Service specific presence information may include Application Specific Availability (e.g. if a presentity is provisioned with a Telephony Service, is within coverage, has an appropriate handset, et cetera, the user is available for a telephone call), Service Description (e.g. a client can state what service capabilities it supports, for example Video Call, Instant Messaging, Chess Game etc.), or Session Participation (e.g. a client can indicate whether a user is currently involved in a session of some kind, for example a telephone call). Device specific presence information may include network availability or location, and may be updated a user or by resources such as the mobile network or other server based applications.

A presence service governs the access rules to the presence information so that only authorized entities are allowed to see or update the presence information. It handles the distribution of presence information to the interested entities.

Group and Data Management (G&DM) is the capability to manage network-based user-specific service-related information for different types of services. It can be seen as the self-provisioning aspect of an IMS terminal based application. Each end-user manages and owns this type of data, which is required by most applications. These data types are, for example, access lists related to presence information, groups used to set-up group calls and presence lists that are used for subscriptions to presence information for lists of users.

Group and data information is stored in a group and data management function where it can be accessed and manipulated (created, changed or deleted) by authorized users.

Message Waiting Indication (MWI) provides the possibility to subscribe and receive updates about pending messages in the network (e.g. unread emails or voice messages that haven't yet been played). The information is normally provided to PGM by so called Presence Network Agents (PNA), which publish the current state on-behalf of the user.

PGM can be used to enhance content-to-person applications by making up-to-date information available in the user terminal from almost any source or application. The content will be available in the terminal in the form of, for example, icons with attached messages. Examples include widgets, advertising and surveillance.

Extensible Messaging and Presence Protocol (XMPP) is an open-standard communications protocol for message-oriented middleware based on XML (Extensible Markup Language), and is used in IM, VoIP and file transfer signalling. XMPP uses an open systems approach of development and application, by which anyone may implement an XMPP service and interoperate with other organizations' implementations.

The Internet Engineering Task Force (IETF) formed an XMPP Working Group in 2002 to formalize the core protocols as an IETF instant messaging and presence technology. RFC 3920, RFC 3921, RFC 3922, RFC 3923 were approved by the Internet Engineering Steering Group as Proposed Standards in 2004. RFC 3920 and RFC 3921 have been superseded by RFC 6120 and RFC 6121 respectively, and RFC 6122 specifies the XMPP address format.

Google Docs is a suite of products that lets you create different kinds of online documents, work on them in real time with other people, and store your documents and your other files online. With an Internet connection, documents and files can be accessed from any computer. This guide gives a quick overview of Google Docs: http://support-.google.com/docs/bin/answer.py?h1=en&answer=49008

Currently available conferencing service systems allow sharing of presentations, documents, desktops, etc. between participants in the conference. Currently, there are solutions to share files being modified; they must be stored in a common storage repository, but it is not possible to share file editing stored locally to each user in the conference.

SUMMARY

It is an object of the invention to improve the ability to share documents even when they are being modified by one or more sharing participant. According to a first aspect, there is provided a method of handling a data object accessible by more than one node. A server in a communication network stores information relating to the data object stored at a first node. The server then receives a subscription request message from a second node. This subscription request message subscribes to updates relating to the data object stored at the first node. A copy of the data object is accessible by the second node. The server subsequently receives a publication message relating to a change to the data object stored at the first node. The publication message indicates an identity of the data object and an indication of the changes. The server then sends a notification message relating to the change to the data object towards the second node. The notification message can be used by the second node to make corresponding changes to the copy of the data object accessible by the second node.

An advantage of this is that all subscribing nodes are notified of changes whenever a data object is changed, without the requirement of sending the entire data object to all sharing participants and without requiring that only one participant has floor control. This has advantages in terms of security and reducing bandwidth required when sharing a data object.

As an option, the server sends towards the second node a response to the subscription request message. The response includes of an acknowledgement of the subscription message and/or a notification comprising information relating to the data object stored at the first node.

After receiving the publication message, the server optionally sends a further notification message relating to the change to the data object towards a third node, the further notification message being usable by the third node to make corresponding changes to the copy of the data object accessible by the third node. It will be appreciated that further nodes may also subscribe to notification messages.

The method can be used on any type of data object, examples of which include an electronic file, an electronic document, an executable file, an electronic library, a database and so on.

As an option, the second node receives the notification message relating to the change to the data object at the first node and uses information in the notification message to make corresponding changes to the copy of the data object accessible by the second node. The advantage of this is that all copies of a shared data object remain up to date.

As an option, after the server has received the subscription request message, the server determines an identity of any of the second node, a user associated with the second node, and a User Agent associated with the second node. On the basis of the determined identity, the server can decide whether the second node is authorised to receive the notification message relating to the data object. An advantage of this is that unauthorized users cannot subscribe to changes to the shared data object.

The stored information relating to the data object stored at the first node optionally includes any of the identities of further nodes authorised to receive the notification message relating to the data object, and the identities of further nodes authorised to send to the server the publication message relating to a change to the data object. An advantage of this is that the server can control which nodes can publish updates to the data object, and which nodes can subscribe to updates.

As an option, the stored information relating to the data object includes a filter rule defining limits to information that can be provided to the second node.

While the method can be applied to most types of communication network, an optional example is that the server is an Application Server located in an IP Multimedia Subsystem communication network. In this case, the subscription request message is optionally a SIP SUBSCRIBE, the publication message is a SIP PUBLISH and the notification message is a SIP NOTIFY.

The server optionally receives any of the subscription request message and the publication message via a proxy node, the proxy node having authenticated a user sending the message. An advantage of this is that other nodes (such as CSCFs in an IMS network) that already have this type of functionality can be used to support the server.

According to a second aspect, there is provided a server for use in a communication network. The server is provided with a first receiver for receiving from a first node information relating to a data object stored at the first node. A computer readable medium in the form of a memory is provided, for storing the information relating to the data object stored at the first node. A second receiver is provided for receiving from a second node a subscription request message, subscribing to updates relating to the data object stored at the first node, a copy of the data object being accessible by the second node. A third receiver is provided for receiving from the first node a publication message relating to a change to the data object stored at the first node, the publication message indicating an identity of the data object and an indication of the changes. A transmitter is provided for sending a notification message relating to the change to the data object towards the second node, the notification message being usable by the second node to make corresponding changes to the copy of the data object accessible by the second node.

An advantage of this type of server is that all subscribing nodes are notified of changes whenever a data object is changed, without the requirement of sending the entire data object to all sharing participants and without requiring that only one participant has floor control. This has advantages in terms of security and reducing bandwidth required when sharing a data object.

As an option, the server is provided with a third transmitter for sending towards the second node a response to the subscription request message, the response comprising any of an acknowledgement of the subscription message and a notification comprising information relating to the data object stored at the first node.

The server is optionally provided with a fourth transmitter for, after receiving the publication message, sending a further notification message relating to the change to the data object towards a third node, the further notification message being usable by the third node to make corresponding changes to the copy of the data object accessible by the third node.

As an option, the stored information relating to the data object includes any of the identities of further nodes authorised to receive the notification message relating to the data object, and the identities of further nodes authorised to send to the server the publication message relating to a change to the data object.

According to a third aspect, there is provided a node for use in a communication network. The node is provided with a computer readable medium in the form of a memory for storing a copy of a data object stored at a further node. A transmitter is provided for sending to a server a subscription request message, the subscription request message subscribing to updates relating to the data object stored at the further node. A receiver is provided for receiving from the server a notification message, the notification message including information relating to changes to the data object stored at the further node. A processor is provided for effecting changes to the copy of the data object stored at the node, the changes corresponding to the changes made to the data object stored at the further node.

An advantage of this is that the node can subscribe to updates relating to a shared data object. If the further node makes changes to its local copy of the data object, the node is notified of the changes and can make corresponding changes to the copy of the data object at the node.

According to a fourth aspect, there is provided an issuer node for use in a communication network. The issuer node is provided with a computer readable medium in the form of a memory for storing a data object. A first transmitter is provided for sending to a server information relating to the data object. A processor is also provided that is arranged to determine that a change has been made to the data object. A second transmitter is provided for sending to the server a publication message, the publication message identifying the data object and including information relating to the change made to the data object. This allows the server to be informed that a change has occurred to the data object, and to notify other subscribing nodes about the change.

According to a fifth aspect, there is provided a computer program comprising computer readable code which, when run on a server in a communications network, causes the server to perform the method as described above in the first aspect.

According to a sixth aspect, there is provided a computer program comprising computer readable code which, when run on a node in a communications network, causes the node to behave as a node as described above in the third aspect.

According to a seventh aspect, there is provided a computer program comprising computer readable code which, when run on a node in a communications network, causes the node to behave as an issuer node as described above in the fourth aspect.

According to an eighth aspect, there is provided a computer program product comprising a computer readable medium and a computer program as described above in any of the fifth, sixth or seventh aspects, wherein the computer program is stored on the computer readable medium.

DETAILED DESCRIPTION

A "Working object" (WO) is a data object that maybe subject to any sharing capability. For example, a WO can be a document, a project plan or a database that can be manipulated by more than one user. A service enabler is described below that allows WO information to be transmitted, and allows this information to be published, subscribed to, and users notified of "WO" updates. A user need not work on a unique copy of the WO stored in a unique repository, but each sharing user maintains its own physical copy of the WO in its own repository and all copies are aligned locally when any sharing user introduces a change to the WO. This improves security where each user stores its own WO and only changes are notified, rather than a whole modified WO being sent over a network. It also improves operational efficiency. For example, when working on a software development project, each user would have its own copy of the software programs to execute, compile and test.

Figure 1:
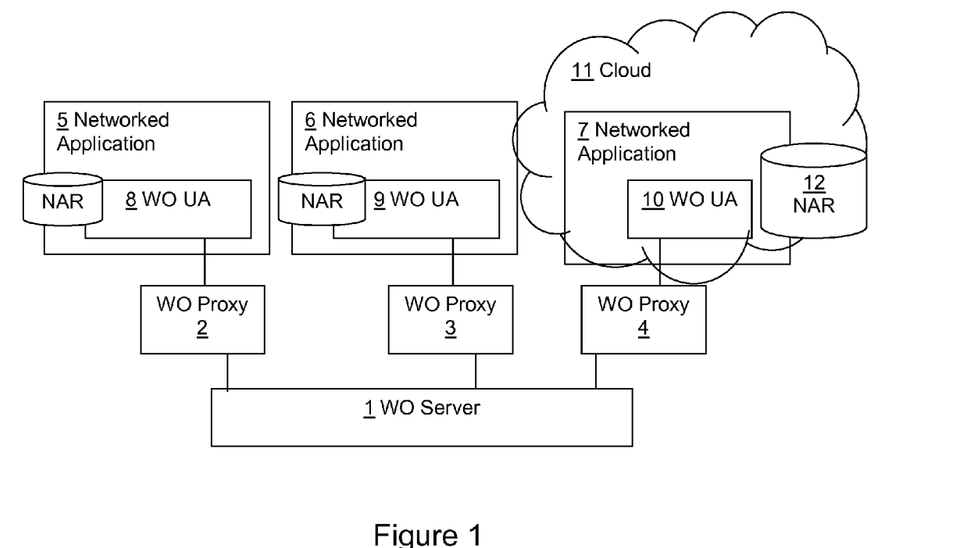
FIG. 1 illustrates schematically in a block diagram a network architecture according to an embodiment of the invention.

FIG. 1 illustrates a network architecture. A WO Server 1 is provided to store WO entities and relations and enables a WO User Agent to subscribe to, publish and be notified about the WO information. A plurality of WO Proxies 2 are shown. Each WO proxy 2 provides WO User Agents with related functions such as user authentication and that provides WO entity related functionality such as determining which WO server is associated with a WO.

A plurality of Networked Applications 5, 6, 7 are shown, each connected to an associated WO Proxy 2, 3, 4. A Networked Application is any kind of application that integrates a WO user agent in order to inherit the introduced sharing capability. An example of a Networked Application is Open Office, which allows sharing of files.

Each Networked Application 5, 6, 7 communicates with the respective WO Proxy 2, 3, 4 via a WO User Agent 8, 9, 10. A WO User Agent is typically a network terminal that is integrated in one of the possible networked applications (e.g. Open Office). Such a WO User Agent has network capabilities and is able to send and receive, notify, subscribe and be notified about WO information.

Figure 2:
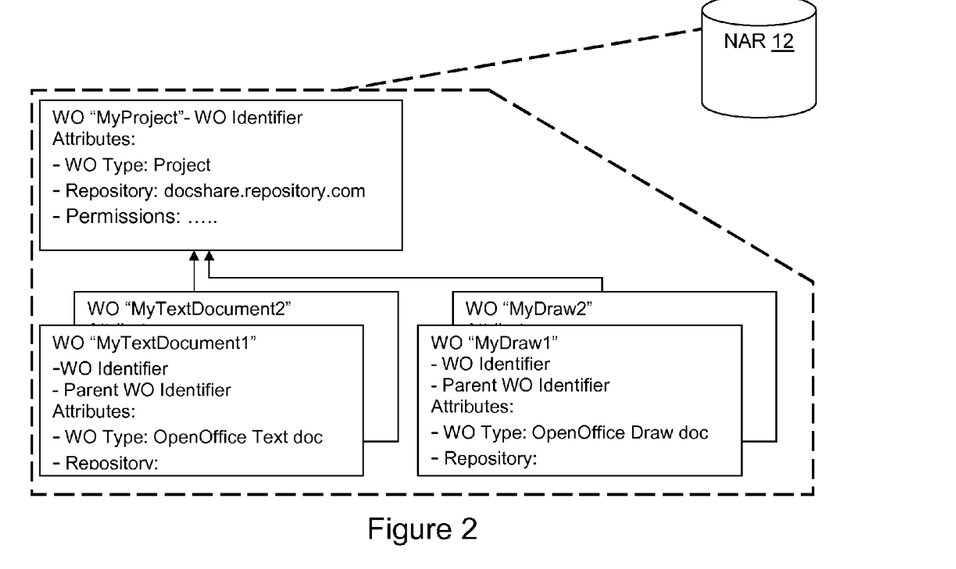
FIG. 2 illustrates schematically in a block diagram a networked application repository architecture according to an embodiment of the invention.

Note that the architecture allows working directly with Networked Applications 5, 6, or with a Networked Application 7 operating in a cloud infrastructure 11. In this case, a WO relation could be stored in a Networked Application Repository 12 together with the WO itself (documents, databases, etc). An example of such a deployment may include OpenOffice and Open Workbench: the cloud infrastructure 11 hosts the networked OpenOffice and Workbench applications with the repository of the WOs and relations among them: documents, databases and projects. FIG. 2 shows an example of a Networked Application Repository 12 architecture in which the Networked Application Repository 12 includes a parent WO "MyProject", and various text and graphics documents associated with the parent WO.

The WO Server 1 is able to receive and manage WO information that is published by a WO Issuer User Agent 8, 9, 10. Different types of WO can be defined for different purposes, for different applications and for different users. The WO Server 1 also allows WO User Agents 8, 9, 10 to request and subscribe to WO information. Before a subscription to WO information is accepted, the WO Server 1 may attempts to verify the identity of the User Agent that subscribes to WO information to ensure that the User Agent is entitled to subscribe to that WO information. In this embodiment, the WO Server 1 provides a Subscription Authorization Policy which WO User Agents are allowed to subscribe to given WO information. The Subscription Authorization Policy also determines the WO information to which a WO User Agent has access.

The WO Server 1 also provides Authorization Policy for the issue of WO information. The WO Issue Authorization Policy determines which WO Issuer Users are allowed to publish WO information. The WO Server 1 may provide a WO User Agent 8, 9, 10 a configurable filtering function that is used to limit the information that is delivered to a WO User Agent. The filter is at least a number of WO entities. After subscription the authorized WO User Agents 8, 9, 10 are notified of the actual WO Information based on the Subscription Authorization Policy and the filters set by the User Agent in the subscription.

The WO server 1 may receive requests for fetching or subscribing WO information. In response to WO User Agent information fetches, the WO server 1 provides requested WO information. In response to WO information subscriptions, the WO server provides notification of the WO information updates. When there are subsequent changes in the subscribed WO information, notifications of the changes in WO information are sent to the relevant WO User Agent.

In this embodiment, in order to support a WO service across network borders, generic network functions are provided, e.g. routing and security. The WO proxies 2, 3, 4 provide these functions.

Figure 3:
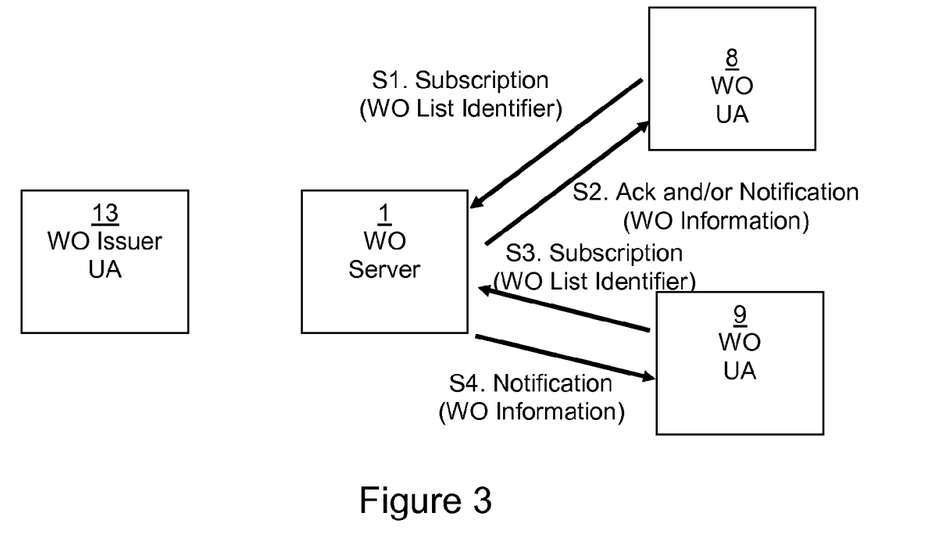
FIG. 3 illustrates schematically a network architecture and subscription request signalling between functional entities according to an embodiment of the invention.

FIG. 3 illustrates interworking in which a WO User Agent 8 sends S1 a request to the WO Server 1 to subscribe to receive WO information for a specific WO (identified by a certain WO Identifier). The WO server 1 sends S2 an Acknowledgement and/or the already available WO information. A similar process is repeated in steps S3 and S4 for WO User Agent 9.

Figure 4:
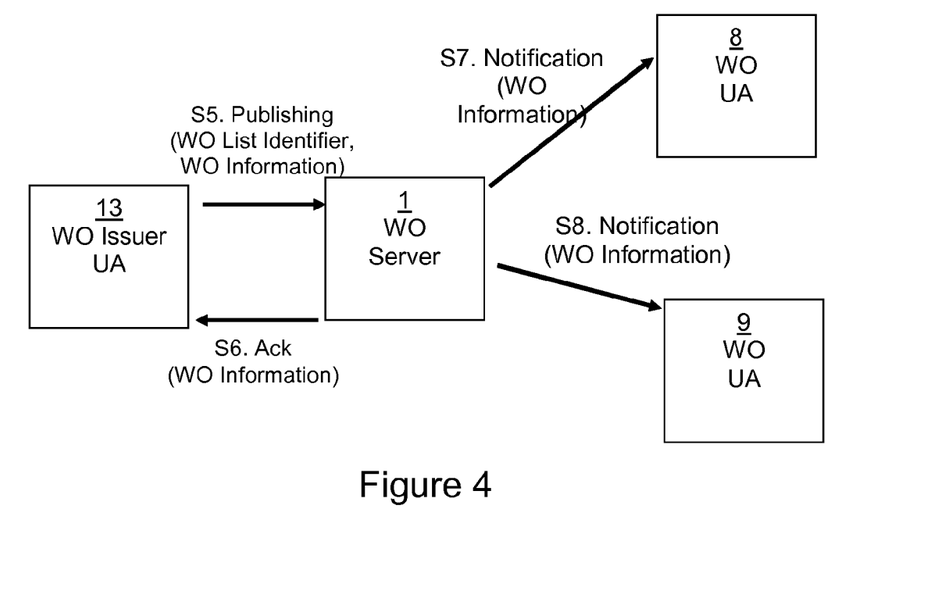
FIG. 4 illustrates schematically a network architecture and notification signalling between functional entities according to a further embodiment of the invention.

FIG. 4 illustrates the example where an issuer WO user agent 13 sends WO information to the WO Server and the WO server 1 sends the available WO information towards the subscribed User Agents 8, 9. In this case, the Issuer UA 13 publishes an update about the WO and sends S5 a publish message to the WO Serve 1, which acknowledges S6 the publish message. WO User Agents 8, 9 are subscribed to updates for this WO, and so a notification message is sent S7, S8 to WO User Agents 8, 9.

The techniques described above allow each Networked Application 5, 6, 7 to locally store a WO and to subscribe to updates about any changes to the WO. The WO does not need to be sent to each subscribing User Agent.

There are several ways in which the techniques described above can be used when interworking with a WO. The following are provided by way of example only:

Regulation of Access Rights

In this case, more than one user work may work on the same document. One of the users (an admin) has the rights to change the access rights on the WO for the other users. When the admin enters a command to change the access rights, its WO User Agent sends a publishing request. All users subscribed to receive the WO information receive a notification from the WO Server 1. The WO information may be encoded in a format such as:

WO Identifier x
    Repository: mydocshare.myrepository.com
    Permissions:
        user 1: read only
        user 2: read only
        user 3: read and write Subscribed User Agents are connected to User 1, 2 and 3 above, but also to the network application part that is deployed in the cloud with the document and the WO repository (Network Application Repository). A similar solution may apply to the case of a document that is stored locally at every user repository.

Sharing Changes

In this case, more than one user may work on the same WO, for example two people may work from home on the same presentation document. Given a WO such as a document shared in a cloud infrastructure, one user (user 3) has the permission to write the document. When user 3 creates and edits the document, its WO User Agent sends a publishing request with all WO information (creation/modification/deletion of the document). All subscribed users will receive a notification relating to the changes. The WO information may be encoded in a format such as the following:

For creation of the WO:
    Publishing
       Create WO "MyProject"
       Attributes:
       WO Type: Worbeck Project
       Repository: mydocshare.myrepository.com
       Permissions:
          user 1: read only
          user 2: read only
          user 3: read and write
    Ack to Notification: the WO Identifier is assigned by the
       WO Server
       Created WO "MyProject"—
          WO Identifier
          Repository: mydocshare.myrepository.com
    Notification
       Created WO "MyProject"
          WO Identifier Attributes:
          WO Type: Worbeck Project
          Repository: mydocshare.myrepository.com Permissions:
user 1: read only
user 2: read only
user 3: read and write
For a change to the WO:
Publishing
   Change WO "MyProject"
   Attributes:
   WO Type: Worbeck Project
   Repository: mydocshare.myrepository.com
   Changes: < . . . > note that how to report the changes will depend on the type of application (text editor, workbench project, etc.).
Notification
Publishing
   Change WO "MyProject"
   Attributes:
   WO Type: Worbeck Project
   Repository: mydocshare.myrepository.com
   Changes: < . . . > note that how to report the changes will depend on the type of application (text editor, workbench project, etc.).
For deletion of the WO:
Publishing
   Delete WO Identifier
   Repository: mydocshare.myrepository.com
Notification
   Deleted WO Identifier
   Repository: mydocshare.myrepository.com Subscribed User Agents are associated with User 1, 2 and 3, and also with the network application part that is deployed in the cloud with the document and WO repository (Network Application Repository).

Similar solutions may apply to the case of a document that is stored locally at every user repository.

Sharing Project Task Alerting and Status Notifications

If the type of the WO subject of the sharing is relevant for this kind of application, automatic triggers are issued depending on WO contents and external conditions such as the time or completion of other tasks. For example if the WO consist of a project timeline with tasks assigned to the subscribers, automatic notifications are be delivered when a tasks is due to start and/or finish to the registered task owners and other interested subscribers. Other possible triggers could, for example, be related to the location of the subscriber.

Notifications on Non-Enabled Terminals

The presence system used by the WO Server 1 may detect that a subscriber is not currently using a terminal able to support the handling of the detailed document changes notifications. In this case, an indication of the performed changes could be delivered in any case. Using this mechanism, a user would be notified of a change to a WO that he/she is interested in, and also when he/she is connected with a terminal not supporting this specific protocol extension.

While it will be appreciated that the basic network architecture combing PGM and sharing documents can be implemented in most types of communication network, the following description gives examples of implementation in an IMS/SIP based network.

In this case, a WO user agent 8 uses SIP signaling capabilities to transmit and receive WO information, for example a SIP "MESSAGE" to send/receive WO information, a SIP "PUBLISH" to update WO information and to make it available to any subscribed user, SIP "SUBSCRIBE" to fetch and/or to subscribe to any WO updates and "SIP NOTIFY" to receive any WO information.

In this embodiment, the WO Server 1 supports SIP-based communications for publishing and notification of WO information. The WO Server 1 is a SIP Application Server and is located using SIP URLs, standard SIP and existing IMS mechanisms (SIP routing, HSS query, ISC filtering, etc).

The functionalities of a WO Proxy 2 are handled by a Proxy-Call Session Control Function (P-CSCF), an Interrogating-Call Session Control Function (I-CSCF) and a Serving-Call Session Control Function (S-CSCF), as defined in 3GPP TS 23.002 and in 3GPP TS 23.228. The S-CSCF is responsible for authentication according to procedures described in 3GPP TS 33.203. Charging and accounting procedures are conducted as per procedures defined by 3GPP TS 32.200, 3GPP TS 32.225. Security mechanisms between the IMS user and the WO proxy are defined by 3GPP TS 33.210. Procedures for locating, routing to and accessing the WO Server 1 for given WO information are defined in 3GPP TS 23.228 and 3GPP 23.218.

The WO Issuer User Agent 13 sends a SIP PUBLISH to make WO information available at the WO Server 1. This PUBLISH transaction is routed and handled by the IMS infrastructure according to standard IMS routing and ISC procedures defined in 3GPP TS 23.228 and 3GPP TS 23.218.

A subscribing WO User Agent 8 sends a SIP SUBSCRIBE to the WO Server 1 to subscribe or fetch WO information. This SUBSCRIBE transaction is routed and handled by the IMS infrastructure according to standard IMS routing and ISC procedures defined in 3GPP TS 23.228 and 3GPP TS 23.218.

The WO information is provided from the WO Server 1 to subscribing WO User Agent 8 using SIP NOTIFY along the dialogue setup by SUBSCRIBE either within the NOTIFY payload, or via a URL provided in the NOTIFY.

Figure 5:
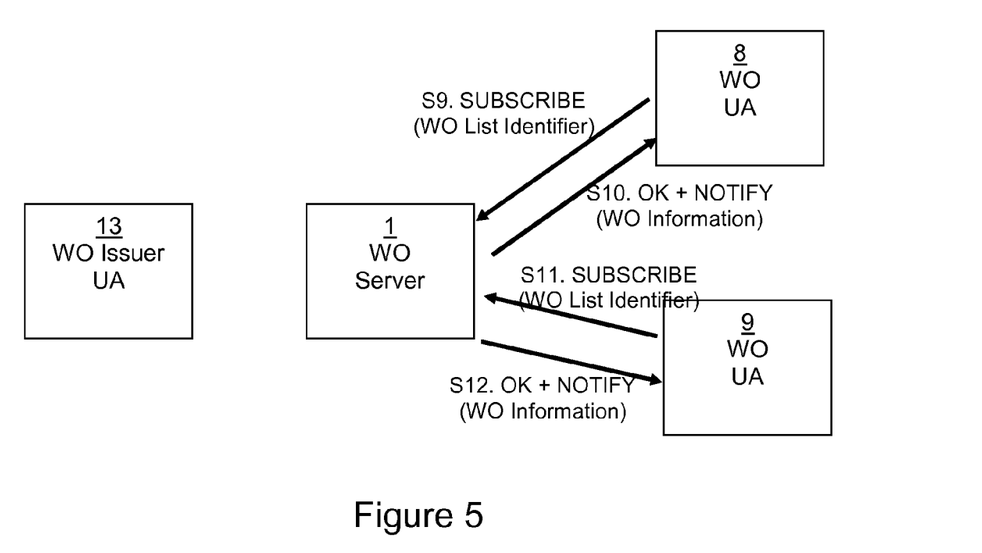
FIG. 5 illustrates schematically a network architecture and SIP signalling between functional entities according to an embodiment of the invention.

FIG. 5 illustrates in an IMS network the same sort of signalling shown in FIG. 3. A WO User Agent 8 sends S9 a SIP SUBSCRIBE that includes a WO list identifier S9 to the WO server 1 to receive WO information for a specific WO. The Wo server responds S10 with a SIP OK and any already available information relating to the WO using a SIP NOTIFY. Similar signalling S11, S12 may be used by another WO User Agent 9.

Figure 6:
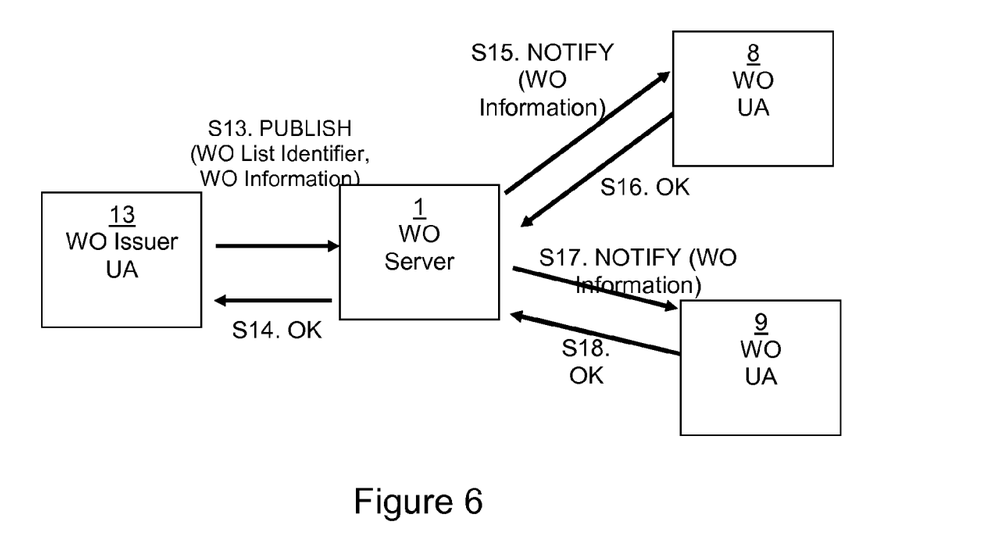
FIG. 6 illustrates schematically a network architecture and SIP signalling between functional entities according to a further embodiment of the invention.

FIG. 6 illustrates in an IMS network the same sort of signalling shown in FIG. 4. A WO Issuer UA 13 publishes S13 WO information using a SIP PUBLISH that includes an identifier of the WO and WO information. The SIP PUBLISH is sent to the WO Server 1, which responds S14 with a SIP OK. The WO Server 1 sends S15 a SIP NOTIFY to a subscribing WO UA 8, which responds S16 with a SIP OK. The WO Server sends S17 a further SIP NOTIFY that includes the WO information to a further WO User Agent 9, which responds S18 with a SIP OK.

Figure 7:
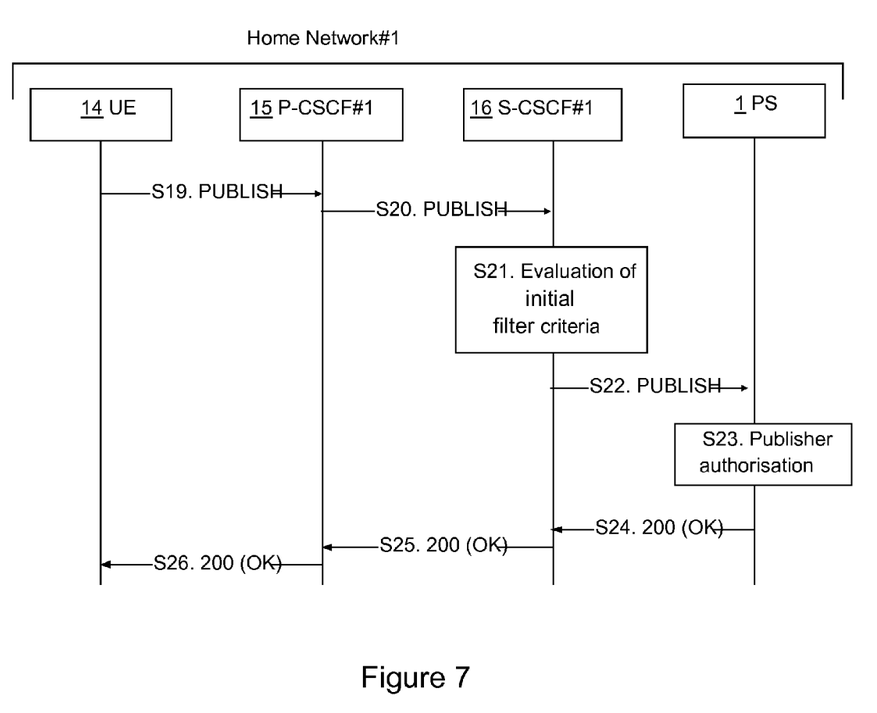
FIG. 7 is a signalling diagram showing signalling required for publication of a working object according to an embodiment of the invention.

FIG. 7 illustrates the publishing signalling when a WO Issuer User Agent is in the same network as the WO Server 1. A UE 14 in this case is acting as a WO Issuer UA 8. a P-CSCF 15 and a S-CSCF are acting as a WO proxy 2. The UE 14 detects a change in a WO held at the UE 14 and sends S19 a PUBLISH towards the WO Server 1. The PUBLISH is sent to the P-CSCF 15, which forwards S20 it to the S-CSCF 16. The S-CSCF 16 evaluates any initial filter criteria and takes the appropriate action S22 to send the PUBLISH towards the WO Server 1. The WO Server 1 determines S23 that the UE 14 is authorised to publish changes to the WO, and sends S24, S25, S26 a SIP 200 OK to the UE 14 via the S-CSCF 16 and the P-CSCF 15.

Figure 8:
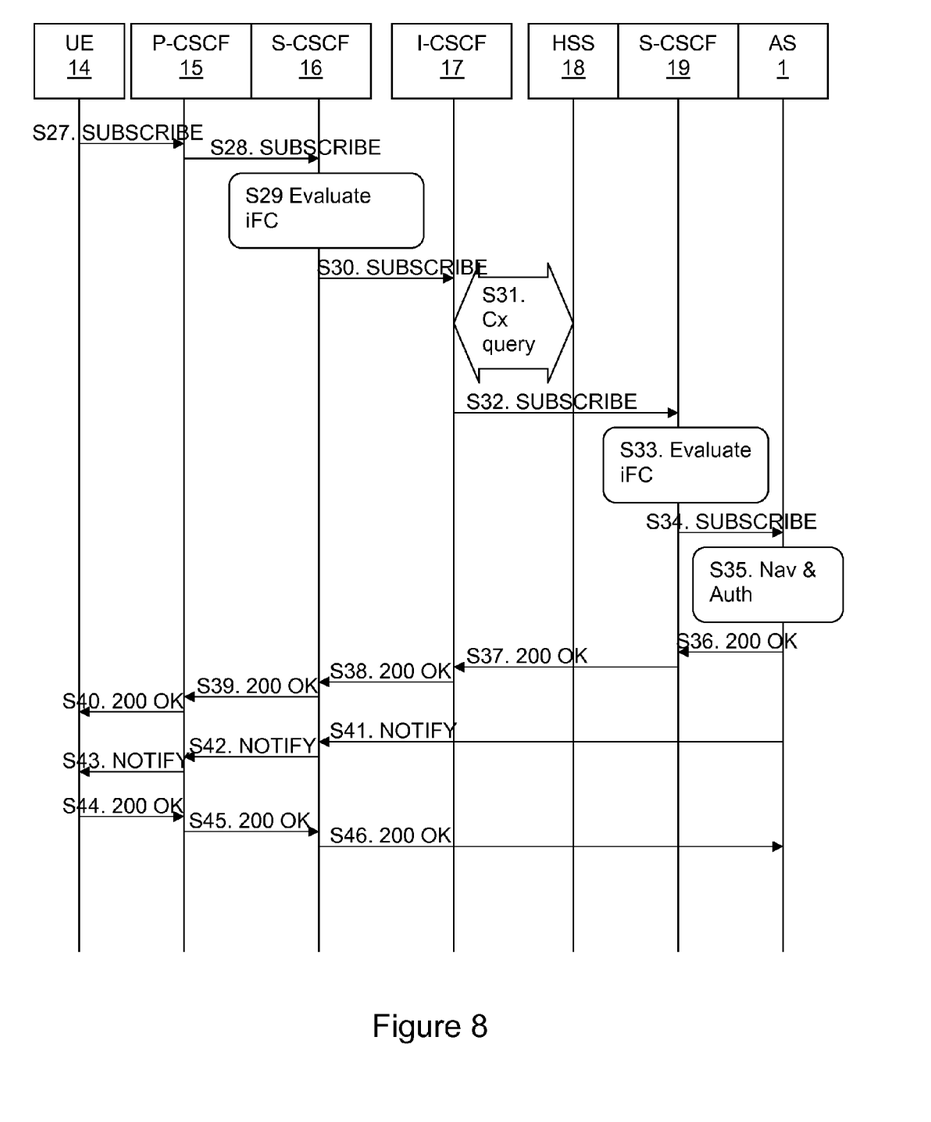
FIG. 8 is a signalling diagram showing signalling required for subscription to a working object and notification of changes according to an embodiment of the invention.

FIG. 8 illustrates a subscription procedure when a subscribing UE 14 is in a different IMS network to the WO Server 1. The UE 14 sends S27 a SUBSCRIBE to the P-CCF 15 in its home network. The P-CSCF forwards S28 the SUBSCRIBE to the S-CSCF 16. The S-CSCF 16 evaluates S29 the iFCs and takes the appropriate action of forwarding S30 the SUBSCRIBE to an I-CSCF 17. The I-CSCF performs S31 a user location query with a Home Subscriber Server (HSS) 18 and subsequently sends S32 the SUBSCRIBE to an S-CSCF 19 in the WO Server's 1 network. The S-CSCF 19 evaluates S33 the iFCs and takes the appropriate action of forwarding S34 the SUBSCRIBE to the WO Server 1. The WO Server 1 authorises the SUBSCRIBE and sends S36-S40 a SIP 200 OK back to the UE 14. When any changes to the WO are published, the WO Server 1 sends S41-S43 a SIP NOTIFY to the UE 14 with the WO information. The UE responds S44-S46 with a SIP 200 OK.

Figure 9:
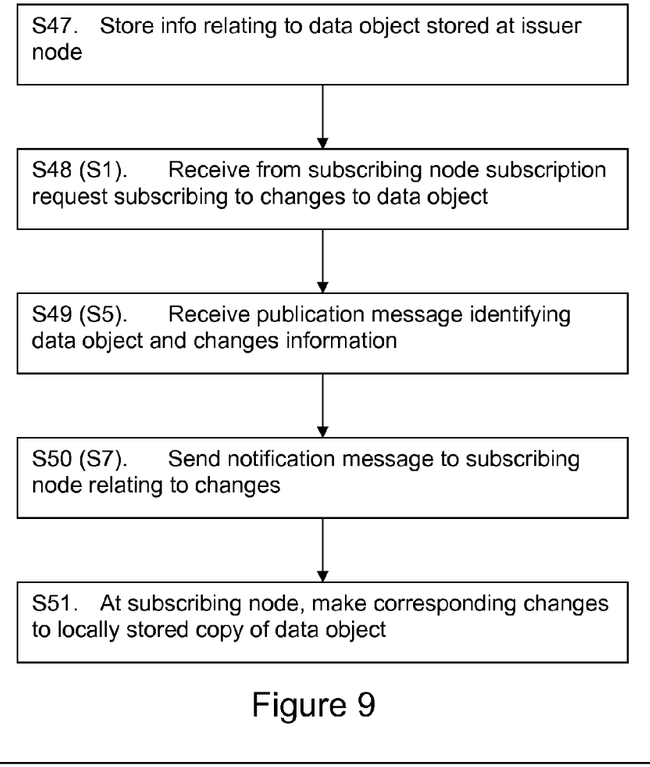
FIG. 9 is a flow diagram illustrating steps according to an embodiment of the invention.

FIG. 9 is a flow diagram illustrating steps of an embodiment of the invention. The following numbering corresponds to that of FIG. 9:

S47. The WO Server 1 stores information relating to a WO stored at an issuer node 13.

S48. A subscribing node 8 sends a subscription request to the WO Server 1 to subscribe to updates relating to the WO. Note that this step is the same as step S1 above.

S49. The issuer node 13 publishes an update relating to a change to the WO and sends a publication message to the WO Server 1. Note that this step is the same as step S5 above.

S50. The WO Server 1 sends a notification message relating to the change to the subscribing node 8. Note that this step is the same as step S7 above.

S51. The subscribing node 8 has a locally stored copy of the WO, and makes changes to the locally stored copy that correspond to the changes identified in the publication message.

Figure 10:
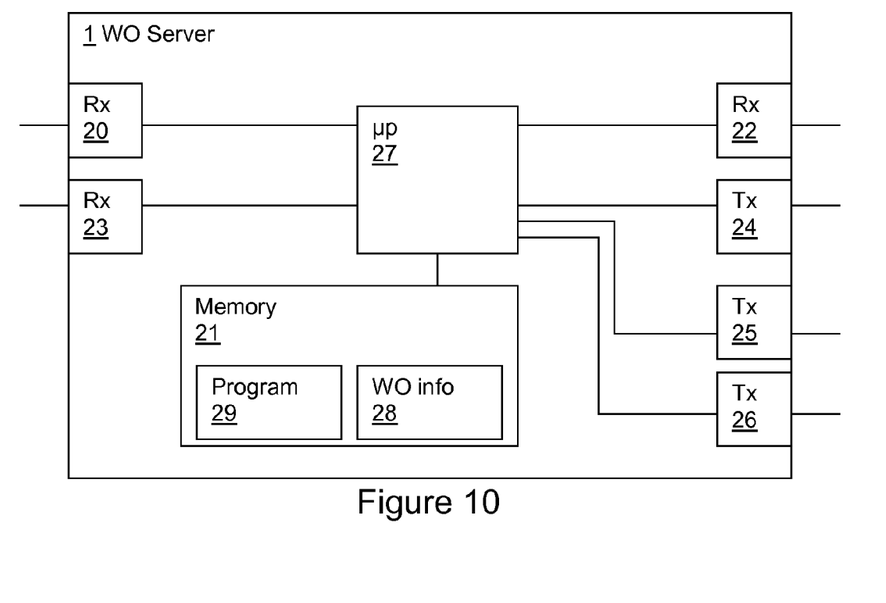
FIG. 10 illustrates schematically in a block diagram a server according to an embodiment of the invention.

FIG. 10 illustrates schematically in a block diagram a WO Server 1 according to an embodiment. The WO Server 1 is provided with a first receiver 20 that receives information about a WO stored at the issuer node 13. A computer readable medium in the form of a memory 21 is provided for storing the information 28 relating to the WO stored at the issuer node 13. A second receiver 22 is provided for receiving a subscription request message from a subscribing node 8. The message subscribes to updates relating to the WO stored at the issuer node 13, and a local copy of the WO is accessible by the subscriber node 8. A third receiver 23 is provided for receiving from the issuer node 13 node a publication message relating to a change to the WO stored at the issuer node 13. The publication message indicates an identity of the WO and an indication of the changes. A transmitter 24 is also provided for sending a notification message relating to the change to the WO towards the subscriber node 8. The notification message is usable by the subscriber node 8 to make corresponding changes to the copy of the WO accessible by the subscriber node 8.

A third transmitter 25 may be provided for a response to the subscription request message to the subscriber node 8. A fourth transmitter 26 may be provided for sending a further notification message relating to the change to the WO towards another node, the further notification message being usable by the other node to make corresponding changes to a copy of the WO accessible by the other node.

A processor 27 is provided to allow the WO Server 1 to control the handle the messages described above. The memory 21 may be used to store a computer program 29 which, when executed by the processor 27, causes the WO Server 1 to behave as described above.

Note that while the above description refers to various receivers and transmitters, these may be physically embodied in one or more devices such as transceivers, transmitters and receivers.

Figure 11:
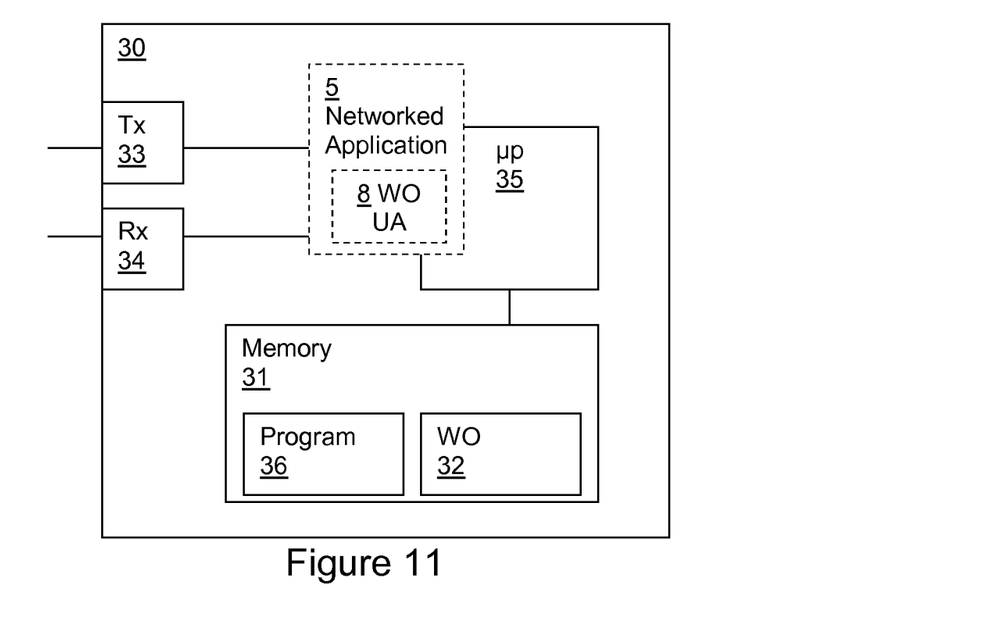
FIG. 11 illustrates schematically in a block diagram a subscribing node according to an embodiment of the invention.

FIG. 11 illustrates schematically in a block diagram a subscriber node 30. The subscriber node is provided with a computer readable medium in the form of a memory 31 for storing a local copy 32 of the WO. A transmitter 33 is provided for sending a subscription request message to the WO Server 1. The subscription request message subscribes to updates relating to the WO stored at the issuer node 13. A receiver 34 is provided for a notification message receiving from the WO Server 1. The notification message includes information relating to changes to the WO stored at the issuer node 13. A processor 35 is provided for effecting changes to the copy 32 of the WO stored at the node, the changes corresponding to the changes made to the data object stored at the further node. The processor 35 may also be used to run the networked application 5. The memory 31 may be used to store a computer program 36 which, when executed by the processor 35, causes the subscriber node 30 to behave as described above.

Figure 12:
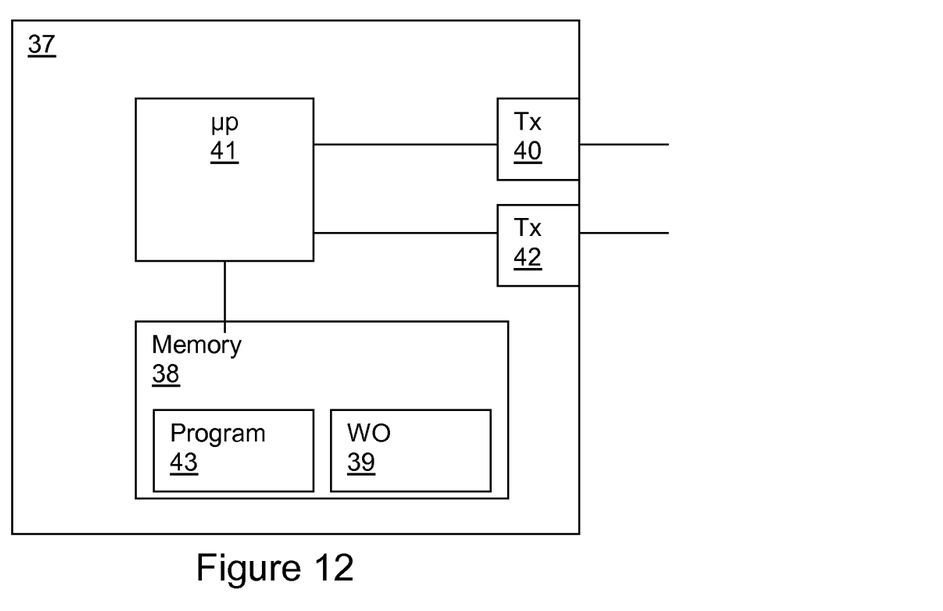
FIG. 12 illustrates schematically in a block diagram an issuer node according to an embodiment of the invention.

FIG. 12 schematically in a block diagram an issuer node 37. The issuer node 37 is provided with a computer readable medium in the form of a memory 38 for storing the WO 39. A first transmitter 40 is provided for sending information relating to the WO to the WO Server 1. A processor 41 is arranged to determine that a change has been made to the WO 39. A second transmitter 42 is provided for sending a publication message to the WO Server 1. The publication message identifies the WO and includes information relating to the change made to the WO 39. The memory 38 may be used to store a computer program 43 which, when executed by the processor 41, causes the issuer node 37 to behave as described above. Note that the transmitters may be physically embodied in one or transmitters.

The techniques described above allow multiple users to work on data objects such as documents, executables, project management and so on. It can be linked with Presence Management to allow available users to collaborate and work together. It will also allow easier integration of networked documents within a communication infrastructure such as a corporate communication infrastructure.

It will be appreciated by the person of skill in the art that various modifications may be made to the above described embodiment without departing from the scope of the present invention. For example, the functions of the various nodes are described as being embodied at a single node, but it will be appreciated that different functions may be provided at different network nodes.

The following acronyms have been used in the above description:

G&DM Group and Data Management
HSS Home Subscriber Server
I-CSCF Interrogating CSCF
IETF Internet Engineering Task Force
iFC Initial Filter Criteria
IM Instant Messaging
IMS IP Multimedia Subsystem
IPTV IP Television
MWI Message Waiting Indication
P-CSCF Proxy CSCF
PEP Presence Enhanced Phone Book
PGM Presence, group and data management
PLMN Public Land Mobile Network PNA Presence Network Agents
S-CSCF Serving CSCF
SIP Session Initiation Protocol
UE User Equipment
Vol P Voice over IP
XML Extensible Markup Language
XMPP Extensible Messaging and Presence Protocol

The invention claimed is:

1. A method of handling a data object accessible by more than one node, the method comprising, at a server in a communication network:

receiving from a first node, information relating to the data object being stored at the first node, wherein the received information relating to the data object stored at the first node includes identities of further nodes authorized to receive a notification message relating to a change to the data object, and identities of the further nodes authorized to send to the server a publication message relating to the change to the data object;

receiving a subscription request message from a second node among the further nodes subscribing to updates relating to the data object stored at the first node, a local copy of the data object being accessible by the second node;

in response, at the server, after receiving the subscription request message from the second node subscribing to updates relating to the data object stored at the first node:

determining an identity of the second node, a user associated with the second node, and a User Agent associated with the second node, and on the basis of the determined identity, determining whether the second node is authorized to receive the notification message according to the received information relating to the data object stored at the first node;

receiving the publication message relating to the change to the data object stored at the first node, the publication message indicating an identity of the data object and an indication of changes; and sending the notification message relating to the change to the data object towards the second node, the notification message being usable by the second node to make corresponding changes to the local copy of the data object accessible by the second node.

2. The method according to claim 1, further comprising, at the server:

sending towards the second node a response to the subscription request message, the response comprising any of an acknowledgement of the subscription request message and a notification comprising the information relating to the data object stored at the first node.

3. The method according to claim 1, further comprising:

after receiving the publication message, sending a further notification message relating to the change to the data object towards a third node among the further nodes, the further notification message being usable by the third node to make corresponding changes to a local copy of the data object accessible by the third node.

4. The method according to claim 1, wherein the data object is selected from any of an electronic file, an electronic document, an executable file, and a database.

5. The method according to claim 1, further comprising, at the second node:

receiving the notification message relating to the change to the data object at the first node; and using information in the notification message to make corresponding changes to the local copy of the data object accessible by the second node.

6. The method according to claim 1, wherein the information relating to the data object stored at the first node includes a filter rule defining limits to information that can be provided to the second node.

7. The method according to claim 1, wherein the server is an Application Server located in an IP Multimedia Subsystem communication network.

8. The method according to claim 7, wherein the subscription request message is a SIP SUBSCRIBE, the publication message is a SIP PUBLISH, and the notification message is a SIP NOTIFY.

9. The method according to claim 1, wherein the server receives any of the subscription request message and the publication message via a proxy node, the proxy node having authenticated a user sending the subscription request message.

10. A server for use in a communication network, the server comprising:

a first receiver for receiving from a first node information relating to a data object being stored at the first node, wherein the received information relating to the data object stored at the first node includes identities of further nodes authorised to receive a notification message relating to a change to the data object, and identities of the further nodes authorised to send to the server a publication message relating to the change to the data object;

a computer readable memory for storing the information relating to the data object stored at the first node;

a second receiver for receiving from a second node among the further nodes a subscription request message, subscribing to updates relating to the data object stored at the first node, a local copy of the data object being accessible by the second node;

in response, at the server, after receiving the subscription request message from the second node subscribing to updates relating to the data object stored at the first node:

determining an identity of the second node, a user associated with the second node, and a User Agent associated with the second node, and on the basis of the determined identity, determining whether the second node is authorized to receive the notification message according to the received information relating to the data object stored at the first node;

a third receiver for receiving from the first node the publication message relating to the change to the data object stored at the first node, the publication message indicating an identity of the data object and an indication of changes; and a first transmitter for sending the notification message relating to the change to the data object towards the second node, the notification message being usable by the second node to make corresponding changes to the local copy of the data object accessible by the second node.

11. The server according to claim 10, further comprising:

a second transmitter for sending towards the second node a response to the subscription request message, the response comprising any of an acknowledgement of the subscription request message and a notification comprising the information relating to the data object stored at the first node.

12. The server according to claim 10, further comprising:
a third transmitter for, after receiving the publication message, sending a further notification message relating to the change to the data object towards a third node among the further nodes, the further notification message being usable by the third node to make corresponding changes to the local copy of the data object accessible by the third node.

13. A computer program product comprising a non-transitory computer readable medium storing computer readable code which, when run on a server in a communications network, causes the server to perform the method as claimed in claim 1.

\* \* \* \* \*